H. COLL,

Assignor to J. B. & W. J. SHERRIFF.

EJECTOR.

No. 10,169. Reissued July 25, 1882.

Witnesses
R. W. Turnshall
Jno. K. Smith.

Inventor
Hugh Coll
by his attys
Bakewell & Kerr

UNITED STATES PATENT OFFICE.

HUGH COLL, OF BLACK HAWK, ASSIGNOR TO J. B. & WM. J. SHERRIFF, OF PITTSBURG, PENNSYLVANIA.

EJECTOR.

SPECIFICATION forming part of Reissued Letters Patent No. 10,169, dated July 25, 1882.

Original No. 246,084, dated August 23, 1881. Application for reissue filed June 24, 1882.

*To all whom it may concern:*

Be it known that I, HUGH COLL, of Black Hawk, in the county of Beaver and State of Pennsylvania, have invented a new and useful Improvement in Ejectors; and I do hereby declare the following to be a full, clear, and exact description thereof.

My invention relates to improvements in double-head siphon pumps or ejectors; and it consists in making the inner head with a flange or collar of suitable size to close the end of the outer head, and provided with holes or perforations for the passage of water from the outer head to the discharge-tube. The advantages of this construction are that it enables me to make and finish the heads and various parts of a double-acting ejector separately, thereby securing a more perfect form, better operation, facility in fitting, and cheapening the manufacture.

To enable others skilled in the manufacture to make and use my invention, I will now describe its construction and manner of use by reference to the accompanying drawings, in which—

Figure 1:
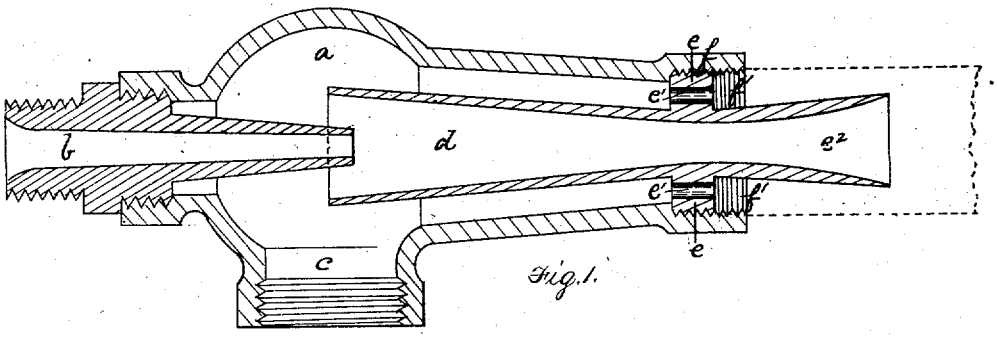
Figure 2:
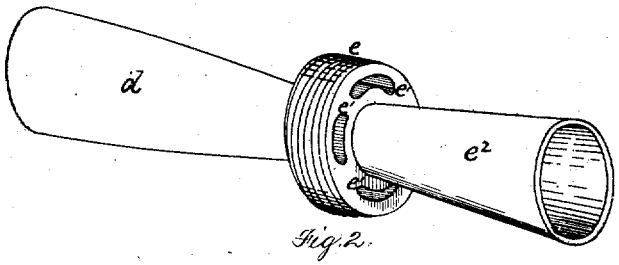
Figure 3:
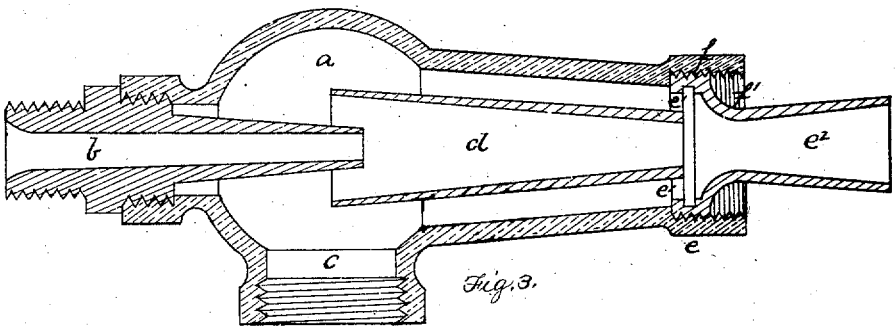

Figure 1 is a longitudinal vertical section of my improved pump. Fig. 2 is a perspective view of the inner head, and Fig. 3 is a modified form of my improvement.

Like letters of reference indicate like parts in each.

The outer head, *a*, is of the usual or any desired form, and is provided with a steam-nozzle, *b*, and induction-opening *c*. The inner head, *d*, is a separate piece, and is formed with a collar or flange, *e*, designed to fit into and close the outer end, *f*, of the head *a*.

In order to make the pump double-acting—that is, to take its water through both heads—I provide suitable openings or water-passages, $e'$, through the flange *e*, which openings may be round or of any other desired shape. If desired, the periphery of the flange may be screw-threaded, and by being screwed into the coupling $f'$ be attached to and support the head *d* in the head *a*; or it may be plain and be merely dropped into the coupling $f'$ and held there by screwing in the discharge-pipe. (Shown at $f^2$ in dotted lines in Fig. 1.) The outer extension, $e^2$, of the head *d* may be omitted, if desired, as it is merely a guide for the inner jet. It acts also to increase the velocity of the outer current by reducing the width of the passage.

The operation of the ejector is as follows: The steam-jet drives out the air from the inner head first, and the water flowing in is caught by the jet and propelled with great velocity through the narrow symmetrical inner head. This draws the air from the outer head through the holes $e'$, and after it the water, establishing the double stream and securing the known advantages of the double-acting ejector.

Fig. 3 shows a modification in which the outlet-openings $e'$ of the outer head, *a*, enter the outer extension, $e^2$, of the head *d*, the inner end of said extension being made flaring where it merges into the flange *e*. In this case the currents from both heads are brought together in the tube $e^2$, which is made to operate as a combining-tube.

In making the double-acting ejector in this form I obtain the advantage of finishing the heads separately, as thereby I am enabled to make their curves more perfectly adapted to securing the best operation of the ejector. I am also enabled to form the openings which supply the water from the outer head to correspond exactly to the power of the inner jet, and thus regulate the operation of the pump. I also save in the cost of fitting, as the labor is much less upon this form than upon previous forms of double-acting ejectors. The flange closes the end of the outer head, except as to the openings $e'$. The effect of this is to preserve the steam-jet from total condensation until it passes the limit of the outer head—that is to say, it does not meet the second supply of water, and is consequently still alive, until it passes entirely beyond the head, and hence has still a reserve power to apply to obtaining a greater velocity and a consequent increase of capacity. This tends to prevent all backlash or reaction in the outer head.

By the term "double head" herein used I mean an ejector having an outer shell and an independent inner shell or head, the inner shell separable from the outer shell; but I wish it distinctly understood that the length of the combining tube or nozzle $e^2$ is not important.

What I claim as my invention, and desire to secure by Letters Patent, is—

1. A double-head double-acting steam-operated water-ejector having a detachable inner head attached to the outer head by a flange provided with openings for the passage of water from the outer head into the discharge-pipe $f^2$, substantially as and for the purposes described.

2. A double-head steam operated ejector having a detachable inner head attached to the outer head by a flange, an outward extension, $e^2$, of the inner head beyond the outer head and discharge-openings leading from the chamber of the outer head through the flange into the said extension, substantially as and for the purposes described.

In witness whereof I have hereunto set my hand.

HUGH COLL.

Witnesses:
SAML. KURTZ,
JOHN KURTZ.